United States Patent [19]
Holland et al.

[11] Patent Number: 5,388,894
[45] Date of Patent: Feb. 14, 1995

[54] PUMP ON DEMAND

[75] Inventors: Russ W. Holland, Holly; Patrick M. Carty, Rochester Hills, both of Mich.

[73] Assignee: ITT Corporation, New York, N.Y.

[21] Appl. No.: 89,081

[22] Filed: Jul. 8, 1993

[51] Int. Cl.⁶ ............................................. B60T 8/32
[52] U.S. Cl. ..................... 303/10; 303/116.1; 303/DIG. 3; 303/DIG. 4; 303/68; 303/115.1; 200/82 D
[58] Field of Search ........... 303/116.1, 119.1, DIG. 3, 303/DIG. 4, DIG. 1, DIG. 2, 10–12, 116.4, 119.2, 113.1, 113.2, 115.1, 115.2, 115.3, 115.4, 115.5, 116.3, 15, 68; 200/82 D, 81.4, 82 R, 61.62; 188/151 A; 60/413

[56] References Cited

U.S. PATENT DOCUMENTS

| | | | |
|---|---|---|---|
| 3,521,934 | 7/1970 | Leiber | 303/10 |
| 3,645,584 | 2/1972 | Leiber et al. | 303/10 |
| 3,659,904 | 5/1972 | Stevens | 303/116.1 |
| 4,569,560 | 2/1986 | Kubo | 303/116.1 |
| 4,724,289 | 2/1988 | Heissler | 200/83 S |
| 4,751,400 | 6/1988 | Gath et al. | 200/82 D |
| 4,799,048 | 1/1989 | Goshima et al. | 303/115.1 |
| 4,880,282 | 11/1989 | Makino et al. | 303/DIG. 3 |
| 4,892,364 | 1/1990 | Burgdorf | 303/116.1 |
| 5,089,675 | 2/1992 | Betterton et al. | 200/82 D |
| 5,197,787 | 3/1993 | Matsuda et al. | 303/DIG. 4 |
| 5,281,014 | 1/1994 | Volz | 303/10 |

FOREIGN PATENT DOCUMENTS

| | | | |
|---|---|---|---|
| 0313292 | 4/1989 | European Pat. Off. | 303/116.1 |
| 0486819 | 5/1992 | European Pat. Off. | 303/116.1 |
| 63-312257 | 12/1988 | Japan | 303/115.4 |
| 1-67464 | 3/1989 | Japan | 303/116.1 |
| 4-66360 | 3/1992 | Japan | 303/11 |
| 4-90951 | 3/1992 | Japan | 303/11 |
| 4-92754 | 3/1992 | Japan | 303/116.1 |
| 4-123963 | 4/1992 | Japan | 303/116.1 |
| 4-266561 | 9/1992 | Japan | 303/116.1 |

*Primary Examiner*—Douglas C. Butler
*Attorney, Agent, or Firm*—Robert P. Seitter; J. Gordon Lewis

[57] ABSTRACT

A brake fluid distribution control system for use in closed antilocking brake systems includes a switch in communication with low pressure accumulators for cyclically activating pumps that evacuate the low pressure accumulators of brake fluid under desired conditions. The method associated with this invention can be implemented by providing an indicator for indicating the amount of fluid within the accumulator and a switch for cyclically activating the pump when the fluid within the accumulator reaches a preselected capacity level. Alternatively, the antilocking brake system electronic controller is provided with appropriate software for cyclically activating the pump that evacuates the accumulators under preselected conditions.

12 Claims, 2 Drawing Sheets

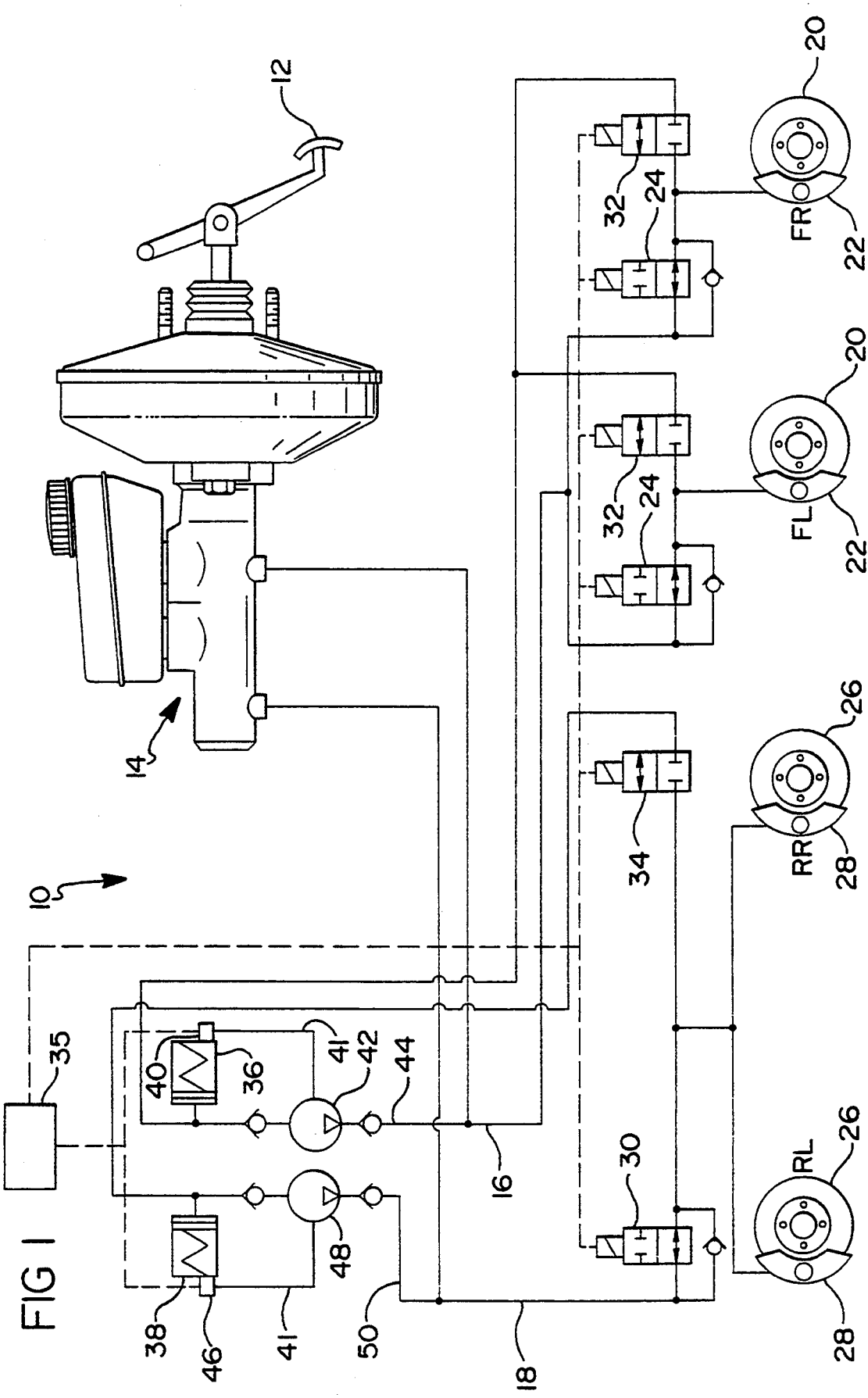
FIG I

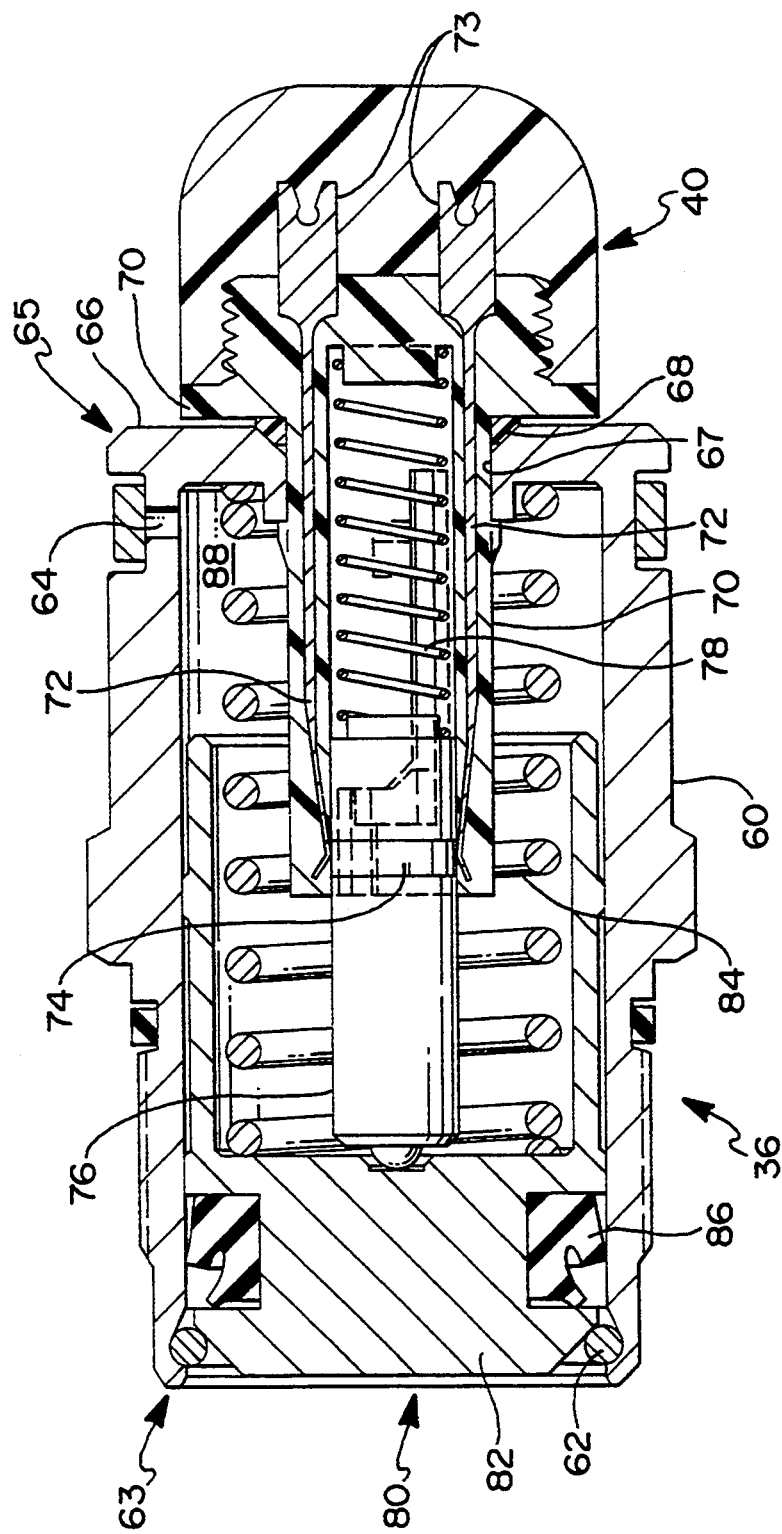

PUMP ON DEMAND

BACKGROUND OF THE INVENTION

1. Field of the Invention

This invention relates to vehicle braking systems. More specifically, this invention relates to a fluid distribution control system for use with a closed system application of an anti-locking braking system.

2. Description of the Prior Art

Presently, some closed antilocking brake systems (ABS's) operate in three basic modes or phases. First, a pressure increase mode is initiated when a vehicle operator applies pressure to a brake pedal in order to initiate a braking action. The ABS operates in pressure increase mode while it is desirable to increase the pressure within the system thereby increasing the pressure that the brakes exert against the wheels to cause deceleration of the vehicle. When the pressure within the system becomes so great as to cause the wheels to "lock" in an undesirable fashion, the ABS enters a pressure hold mode. During the pressure hold mode, a constant pressure is maintained within the brake conduits of the system to provide continued deceleration of the vehicle while concomitantly preventing undesirable wheel lock. A third mode, which typically follows the pressure hold mode, is known as the pressure decrease mode. The pressure decrease mode is typically used when no further pressure is desired for forcing the brakes against the wheels or where a decreased pressure within the brake network is desirable. The pressure decrease mode includes dumping or removing the brake fluid from the brake network conduits and returning it to the master cylinder. During pressure decrease, the fluid first travels through the conduits into low pressure accumulators where it can be collected in a rapid fashion. A pump is typically employed to remove the fluid from the accumulators and return it to the master cylinder.

Conventionally, ABS's have included pumps for draining such accumulators that run continuously throughout all three modes discussed above. Such continuous pump operation is unnecessary, and, at times, undesirable. The pump that drains the accumulators need only operate during the third mode when pressure is being decreased within the system.

Conventional continuous pump operation includes several limitations and drawbacks. First, the pumps typically generate noise at levels that can be disturbing and distracting to a vehicle operator. Second, continuous pump operation requires additional power consumption from a vehicle power source such as the main battery. Further, continuous pump operation potentially introduces excessive wear on the moving parts within the pump and, potentially, other components of the braking system.

Therefore, it is desirable to have cyclical pump operation such that the pump operates to drain the low pressure accumulators only at preselected intervals. This invention addresses the need for cyclical control of the accumulator draining pump and seeks to overcome the drawbacks and limitations discussed above. This invention provides a system for cyclically controlling pump activation during the pressure decrease mode of operation of an antilocking brake system.

SUMMARY OF THE INVENTION

This invention includes a system for controlling the distribution of hydraulic fluid, and thereby the pressure, within the conduits of a vehicle braking network. The system associated with this invention includes an accumulator that is coupled to the brake network conduits and adapted to receive brake fluid in a rapid fashion. The accumulator includes sensing means for indicating the amount of brake fluid within the accumulator. A pump for draining the accumulator is coupled to the accumulator. The inventive system also includes switching means for activating the pump under preselected conditions during a pressure decrease mode such that the pump removes brake fluid from the accumulator and directs that fluid toward the master cylinder within the brake network.

In a preferred embodiment, the accumulator used with the inventive system is a low pressure accumulator. The accumulator preferably includes a housing that has two longitudinal ends; one adapted to be coupled to a pump housing and a second defined by an end wall that has an opening within it. The sensing means within the accumulator preferably includes an indicator piston that is slidably received within the accumulator housing. Biasing means are provided for biasing the indicator piston toward the first longitudinal end of the housing. The position of the indicator piston within the accumulator housing is indicative of the amount of brake fluid within the accumulator.

The sensing means of one embodiment preferably includes a switch housing received in the opening in the end wall of the accumulator housing. A switch piston having a first axial end in communication with the indicator piston and a second axial end disposed within the switch housing is slidably received within the switch housing. A biasing means for biasing the switch piston toward the indicator piston is also provided. An electrical contact has a first end disposed within the switch housing and a second end disposed outside of the switch housing and outside of the accumulator housing. The contact second end is adapted to be electrically coupled to an electronic controller within the ABS network. A band is preferably disposed on the switch piston such that the band engages the electrical contact when the indicator piston moves axially within the accumulator housing to a preselected position, whereby the pump is activated responsively to movement of the switch piston.

Another preferred embodiment of this invention includes a fluid level indicating means within the accumulator that produces a pump activation signal that is recognizable by the ABS electronic controller such that the electronic controller activates the pump for a preselected period in order to remove or evacuate the brake fluid from the accumulator during the pressure decrease mode.

The method of controlling the distribution of brake fluid within the conduits of a vehicle brake network associated with this invention includes three basic steps. First, the accumulator adapted to receive brake fluid from the brake system conduits in a rapid fashion receives brake fluid is provided. Second, whether the amount of brake fluid within the accumulator is at a preselected level indicating that the accumulator should be emptied or drained of brake fluid is determined. Then the pump is selectively activated when the brake fluid within the accumulator reaches the preselected level such that the brake fluid in the accumulator is removed from the accumulator and directed toward a master cylinder within the brake network. Therefore, the pump is activated only for a limited time during a braking application.

These and other features and objects of this invention will become apparent to those skilled in the art from the description of the preferred embodiments and the appended drawings, of which the following is a brief description.

BRIEF DESCRIPTION OF THE DRAWINGS

FIG. 1 is a schematic representation of a closed antilocking braking system.

FIG. 2 is a schematic diagramatic representation of a switching means for cyclically activating a pump within an antilocking brake system.

DETAILED DESCRIPTION OF THE PREFERRED EMBODIMENTS

FIG. 1 schematically shows selected components of an antilocking brake system (ABS). Braking network 10 includes brake pedal 12 which is depressed by a vehicle operator in order to initiate a braking operation when it is desirable to cause deceleration of the wheels and the vehicle. Actuation of the brake pedal causes a plunger (not shown) to move through master cylinder 14 forcing brake fluid from master cylinder 14 into front and rear brake conduits 16 and 18, respectively. Brake fluid traveling through front brake conduit 16 effectively causes front wheels 20 to decelerate because the fluid causes front brakes 22 to bear against front wheels 20. The fluid travelling through front conduit 16 bears against front brakes 22 after travelling through normally open valves 24. In a similar fashion, brake fluid passes through rear conduit 18 to cause rear wheels 26 to decelerate due to rear brakes 28 bearing against rear wheels 26 as the fluid builds up within the conduit travelling through normally open valves 30. FIG. 1 also includes normally closed valves 32 and 34.

A braking network such as that illustrated in FIG. 1 operates under three basic modes. First, a pressure increase mode wherein pressure applied to brake pedal 12 causes brake fluid to flow from the master cylinder through the brake conduits toward brakes 22 and 28. During the pressure increase mode, normally open valves 24 and 30 are open allowing brake fluid to flow and causing brakes 22 and 28 to bear against wheels 20 and 26, respectively.

Under certain conditions a pressure hold mode is then initiated by the conventional ABS electronic controller 35, schematically shown as electrically coupled with components of the ABS. During the pressure hold mode the normally open valves 24 and 30 close; thereby preventing any additional brake fluid from entering the conduits that provide brake fluid and pressure against brakes 22 and 28. The pressure hold mode is maintained under conditions, for example, when a vehicle operator is applying an undesirable amount of pressure to brake pedal 12, thereby causing wheels 20 and 26 to lock. Locked wheels can cause vehicle instability and unsafe driving conditions. In this General manner, an ABS prevents a driver from applying an undesirable amount of pressure to the brakes 22 and 28 and therefore, promotes safer driving.

A third mode is then initiated by the ABS electronic controller 35 which shall be referred to herein as the pressure decrease mode. During the pressure decrease mode, normally closed valves 32 and 34 are opened so that brake fluid can pass through the brake conduits into accumulators 36 and 38, respectively. Accumulators 36 and 38 function as reservoirs and are adapted to receive relatively large quantities of brake fluid in a relatively rapid fashion. This procedure is referred to as dumping brake fluid into the accumulators. It is desirable to then redistribute the fluid from the accumulators through the brake conduits into the master cylinder 14.

Assuming the pressure decrease mode has been initiated and that accumulator 36 is at a preselected capacity, switching means 40 is electrically coupled 41 to and activates pump 42. Pump 42 evacuates or empties accumulator 36 as it removes the brake fluid from within accumulator 36 and directs that fluid through return conduit 44 toward master cylinder 14. Similarly, switching means 46 activates pump 48 to evacuate accumulator 38 by directing the brake fluid within accumulator 38 through return conduit 50 toward master cylinder 14. Switching means 40 and 46 preferably include timing means such that pumps 42 and 48 are activated for a preselected period. In this manner, the inventive system cyclically controls pumps 42 and 48 to remove brake fluid from accumulators 36 and 38, only when necessary.

FIG. 2 illustrates a preferred embodiment of the switching means used with this invention. FIG. 2 shows accumulator 36 and switching means 40. Accumulator 36 includes accumulator housing 60 which is provided with snap ring 62 at a first longitudinal end 63 of accumulator housing 60. Snap ring 62 is provided for coupling accumulator housing 60 to a pump housing (not shown) such that accumulator 36 can be drained by pump 42 when desired. Air vent 64 is defined in accumulator housing 60 near a second longitudinal end 65 of accumulator housing 60. Air vent 64 is provided to control the pressure within the accumulator housing as needed. Second longitudinal end 65 includes end cap 66 that has a hole 67 defined therein. Hole 67 is provided for receiving switching means 40 within accumulator 36. Sealing means 68 is provided between hole 67 and switch housing 70. Alternatively, switch housing 70 could be press-fitted into accumulator housing 60. Switch housing 70 houses a portion of electrical switch contacts 72. Switch contacts 72 have one end disposed within switch housing 70 and a second end connected to leads 73 that are provided for coupling switching means 40 to the electronic controller 35 within the ABS, for example.

Switch contacts 72 interact with contact band 74 which is disposed on switch piston 76. Biasing means 78 is provided to bias switch piston 76 away from leads 73 such that switching means 40 can interact with sensing means 80. Sensing means 80 includes indicator piston 82 that moves axially within accumulator housing 60 in response to changing amounts of brake fluid within accumulator 36. Biasing means 84 is provided to bias indicator piston 82 towards first longitudinal end 63 of accumulator housing 60. Lip seal 86 is provided near one end of indicator piston 82 such that brake fluid will not leak into the portion of accumulator 36 indicated at 88.

As brake fluid enters into accumulator 36, indicator piston 82 slides axially (to the right in FIG. 2) in response to the increased amount of fluid. Switch piston 76 communicates with indicator piston 82 such that switch piston 76 moves axially through switch housing 70 (from left to right according to the drawing) in response to the movement of indicator piston 82. A movement of switch piston 76 causes contact band 74 to come into contact with the first end of switch contacts 72. When contact band 74 and switch contacts 72 are engaged, switching means 40 serves as on switch and the electronic controller 35 activates pump 42 such that pump 42 can drain the brake fluid from accumulator 36.

Leads 73 are provided for electrically coupling switching means 40 with pump 42. In a preferred embodiment, leads 73 are coupled to the ABS electronic controller 35. The electronic controller initiates a pumping cycle when contact band 74 engages switch contacts 72, thereby indicating that a preselected capacity level of brake fluid is within accumulator 36. The electronic controller preferably includes timing means for regulating the period of pump activation. Such timing means could include a relay switch with a time delay or a hysterisis-type switching device, for example, where a more sophisticated timing control strategy is desired.

In conventional ABS's, the pump that evacuates the accumulator would be running during all three modes or phases of the antilocking brake operation. This invention, however, provides the ability to cyclically control activation of such a pump only when desired or needed; accumulator 36 need only be evacuated during the pressure reducing mode.

In another preferred embodiment of this invention, the switching means is modified from the above description. In the latter embodiment, sensing means for indicating the amount of brake fluid within the accumulator include means for producing a pump activation signal that would be recognized by the ABS electronic controller. The ABS electronic controller would then interpret the pump activation signal as indicating that the accumulator should be evacuated of brake fluid. The ABS electronic controller would then initiate a pumping cycle for a preselected period whereby the accumulator is drained of brake fluid until the level of fluid within the accumulator reached a desired level. The electronic controller, therefore, serves as the switching means for activating the pump.

In still another embodiment, the ABS electronic controller would be provided with appropriate software for monitoring the brake fluid level within the accumulators for cyclically activating the pump that removes brake fluid from the accumulators in the general manner described above. The software for the ABS electronic controller would serve as a means for indicating the amount of fluid within the accumulator and for causing the electronic controller to cyclically activate the pump as desired. Several methods can be used with this latest embodiment. One method includes monitoring such variables as the wheel speed, the slip threshold and driving surface recognition. This data is typically available because it is commonly monitored by an ABS electronic controller. Information regarding the wheel speed, slip threshold and the nature of the driving surface provides the ABS controller with the necessary information to determine whether the amount of brake fluid within the accumulators has reached the preselected capacity level. For example, if the wheel speed information indicated that the wheels of the vehicle were decelerating rapidly and that a locking condition occurred, this would indicate to the electronic controller that the pressure hold phase has been initiated. Slip threshold and surface recognition information would provide the electronic controller with the ability to determine when a pressure reducing phase should be initiated relative to the time when wheel lock occurred. The electronic controller then activates the pump for a preselected period until the accumulators are properly evacuated of the desired amount of fluid, at which point the pump would then be deactivated.

The foregoing description is exemplary rather than limiting in nature. Variations and modifications are possible without departing from the purview and spirit of this invention, the scope of which is limited only by the appended claims.

What is claimed is:

1. A system for controlling brake fluid pressure within conduits of a vehicle brake network, comprising:
   an accumulator coupled to the brake network conduits adapted to receive brake fluid, said accumulator including means for sensing the amount of brake fluid within said accumulator;
   a pump hydraulically coupled to said accumulator;
   an electronic controller coupled to said pump;
   switching means, having a switch housing that is partially received within said accumulator and a switch piston in communication with said sensing means, said switching means further including biasing means for biasing said switch piston toward said sensing means, an electrical contact having a first end disposed within said switch housing adapted to contact a conductive band on said switch piston, and a second end coupled to said electronic controller, such that said electronic controller activates said pump under preselected conditions, whereby said pump removes brake fluid from said accumulator.

2. The system of claim 1, wherein said pump is connected to a master cylinder and said brake fluid removed from said accumulator is directed into the master cylinder.

3. The system of claim 1 wherein said accumulator is a low pressure accumulator.

4. The system of claim 1 wherein said accumulator further comprises an accumulator housing having a first longitudinal end adapted to be coupled to said pump and a second longitudinal end defined by an end wall with an opening therein.

5. The system of claim 4 wherein said sensing means comprises:
   an indicator piston slidably received within said accumulator housing; and
   first biasing means for biasing said indicator piston toward said first longitudinal end of said accumulator housing.

6. The system of claim 5 wherein said switching means
   switch housing is received in said opening in said end wall;
   said switch piston has a first axial end in communication with said indicator piston and a second axial end disposed within said switch housing;
   said biasing means biases said switch piston toward said indicator piston;
   said electrical contact second end is disposed outside of said switch housing and said accumulator housing; and
   whereby said pump is activated responsively to movement of said switch piston.

7. The system of claim 6 wherein said switching means further comprises timing means for controlling a period of time that said pump is activated.

8. A method of controlling distribution of brake fluid within conduits of a vehicle brake network, said network including an accumulator coupled to a pump comprising the steps of:
   (a) receiving brake fluid in said accumulator;
   (b) determining when the amount of brake fluid within the accumulator is at a preselected level; and
   (c) selectively activating said pump using a switch comprising a switch housing, a switch piston having an electrically conductive band disposed thereon, and an electrical contact adapted to engage said band when the brake fluid within the accumulator reaches the preselected level of step (b), thereby removing brake fluid from the accumulator.

9. The method of claim 8 further comprising the step of
   (D) deactivating the pump once a preselected amount of the fluid is removed from the accumulator.

10. The method of claim 8 wherein step (c) is performed by the substeps of electrically coupling the pump to a power source, using said switch; and limiting the time that the pump is activated, using the switch.

11. A switch for use in an antilocking brake system that includes an accumulator adapted to receive brake fluid and a pump that is coupled to an electronic controller for draining the accumulator, comprising:

a switch housing that is partially received within the accumulator;

a switch piston having a first axial end disposed outside of said switch housing and a second axial end disposed within said switch housing, said switch piston moving axially relative to said switch housing in response to changes in the amount of fluid in the accumulator;

biasing means for biasing said switch piston toward a rest position wherein said switch piston first axial end is most distal from said switch housing;

an electrical contact having a first end disposed within said switch housing and a second end disposed outside of said switch housing distal from said switch piston, said contact second end being adapted to be electrically coupled to the electronic controller; and a band disposed on said switch piston such that said band engages said electrical contact when said indicator piston moves axially within said switch housing to a preselected position in response to a change in the amount of fluid within the accumulator, whereby said pump is activated by said electronic controller responsively to the movement of said switch piston.

12. The switch of claim 11, further comprising timing means for controlling a period of time that said pump is activated.

* * * * *